(12) United States Patent
Duchesne et al.

(10) Patent No.: US 10,717,795 B2
(45) Date of Patent: Jul. 21, 2020

(54) TETRAFLUOROETHYLENE/HEXAFLUORO PROPYLENE COPOLYMERS HAVING PENDANT SULFONYL GROUPS

(71) Applicant: 3M INNOVATIVE PROPERTIES COMPANY, St. Paul, MN (US)

(72) Inventors: Denis Duchesne, Woodbury, MN (US); Klaus Hintzer, Kastl (DE); Harald Kaspar, Burgkirchen (DE); Kai H. Lochhaas, Neuötting (DE); Jens Schrooten, Muehldorf am Inn (DE); Tilman C. Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/550,314

(22) PCT Filed: Feb. 12, 2016

(86) PCT No.: PCT/US2016/017715
§ 371 (c)(1),
(2) Date: Aug. 10, 2017

(87) PCT Pub. No.: WO2016/130900
PCT Pub. Date: Aug. 18, 2016

(65) Prior Publication Data
US 2018/0016375 A1    Jan. 18, 2018

Related U.S. Application Data

(60) Provisional application No. 62/115,476, filed on Feb. 12, 2015, provisional application No. 62/115,462, filed on Feb. 12, 2015, provisional application No. 62/115,470, filed on Feb. 12, 2015.

(51) Int. Cl.
| | |
|---|---|
| C08F 214/26 | (2006.01) |
| C08K 5/42 | (2006.01) |
| C08J 9/00 | (2006.01) |
| H01B 3/44 | (2006.01) |
| H01B 7/02 | (2006.01) |

(52) U.S. Cl.
CPC ........ *C08F 214/262* (2013.01); *C08F 214/26* (2013.01); *C08J 9/00* (2013.01); *C08K 5/42* (2013.01); *H01B 3/445* (2013.01); *H01B 7/0275* (2013.01); *C08F 2800/10* (2013.01); *C08J 2201/03* (2013.01); *C08J 2327/18* (2013.01)

(58) Field of Classification Search
CPC ............... C08F 214/262; C08F 214/26; C08F 2800/10; C08F 2201/03; C08F 2327/18; C08F 214/28; C08F 2500/12; C08F 2/28; C08J 9/00; C08J 2327/18; C08J 2327/20; C08J 2327/12; C08J 5/121; C08K 5/42; C08K 3/08; C08K 2003/0818; H01B 3/445; H01B 7/0275

USPC ........................................................ 526/242
See application file for complete search history.

(56) References Cited

U.S. PATENT DOCUMENTS

| | | |
|---|---|---|
| 2,559,752 A | 7/1951 | Berry |
| 3,085,083 A | 4/1963 | Schreyer |
| 3,282,875 A * | 11/1966 | Connolly ............ C07C 309/82 524/795 |
| 3,718,627 A | 2/1973 | Grot |
| 4,267,364 A | 5/1981 | Grot |
| 4,273,729 A | 6/1981 | Krespan |
| 4,349,650 A | 9/1982 | Krespan |
| 4,552,925 A | 11/1985 | Nakagawa |
| 4,621,116 A | 11/1986 | Morgan |

(Continued)

FOREIGN PATENT DOCUMENTS

| | | |
|---|---|---|
| EP | 0423995 | 4/1991 |
| GB | 1210794 | 10/1970 |

(Continued)

OTHER PUBLICATIONS

Auhl, ".Molecular Characterization of Semi-Fluorinated Copolymers with a Controlled Amount of Long-Chain Branching", Macromolecules 2006, vol. 39, No. 6, pp. 2316-2324.

(Continued)

*Primary Examiner* — Ling Siu Choi
*Assistant Examiner* — Ronald Grinsted

(57) ABSTRACT

A copolymer having tetrafluoroethylene units, hexafluoropropylene units, and units independently represented by formula in a range from 0.001 to 2 mole percent, based on the total amount of the copolymer. In these units, a is 0 or 1, each b is independently from 1 to 4, c is 0 to 4, d is 0 or 1, and e is 1 to 6. In the —$SO_2X$ groups, X is independently —F, —$NH_2$, —OH, or —OZ, wherein Z is independently a metallic cation or a quaternary ammonium cation. The copolymer has a melt flow index in a range from 20 grams per 10 minutes to 40 grams per 10 minutes. The copolymer can be extruded to make articles, such as insulated cables. A method of making the copolymer is also disclosed.

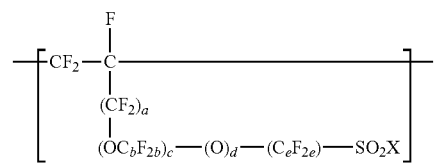

20 Claims, No Drawings

(56) References Cited

U.S. PATENT DOCUMENTS

| | | |
|---|---|---|
| 4,675,380 A | 6/1987 | Buckmaster |
| 4,743,658 A | 5/1988 | Imbalzano |
| 4,764,538 A | 8/1988 | Buckmaster |
| 4,877,815 A | 10/1989 | Buckmaster |
| 5,010,130 A | 4/1991 | Chapman, Jr. |
| 5,013,792 A | 5/1991 | Chapman, Jr. |
| 5,064,594 A | 11/1991 | Priester |
| 5,089,200 A | 2/1992 | Chapman, Jr. |
| 5,093,409 A * | 3/1992 | Buckmaster .............. C08F 8/32 252/511 |
| 5,132,368 A | 6/1992 | Chapman, Jr. |
| 5,182,342 A | 1/1993 | Feiring |
| 5,285,002 A | 2/1994 | Grootaert |
| 5,354,811 A | 10/1994 | Kamiya et al. |
| 5,378,782 A | 1/1995 | Grootaert |
| 5,442,097 A | 8/1995 | Obermeier |
| 5,463,021 A | 10/1995 | Beyer |
| 5,464,904 A | 11/1995 | Chapman, Jr. et al. |
| 5,610,203 A | 3/1997 | Buckmaster |
| 5,639,837 A | 6/1997 | Farnham et al. |
| 5,677,404 A | 10/1997 | Blair |
| 5,688,457 A | 11/1997 | Buckmaster |
| 5,703,185 A | 12/1997 | Blair |
| 5,726,214 A | 3/1998 | Buckmaster |
| 5,780,552 A | 7/1998 | Kerbow |
| 5,874,523 A | 2/1999 | Schmiegel |
| 5,885,494 A | 3/1999 | Venkataraman |
| 6,133,389 A | 10/2000 | Anolick et al. |
| 6,255,536 B1 | 7/2001 | Worm |
| 6,294,627 B1 | 9/2001 | Worm |
| 6,395,848 B1 | 5/2002 | Morgan |
| 6,429,258 B1 | 8/2002 | Morgan |
| 6,521,708 B2 | 2/2003 | Lee |
| 6,541,588 B1 * | 4/2003 | Kaulbach ................. C08F 8/22 526/250 |
| 6,613,941 B1 | 9/2003 | Felix |
| 6,686,426 B2 | 2/2004 | Kaulbach |
| 6,693,164 B2 | 2/2004 | Blong |
| 6,703,464 B2 | 3/2004 | Kono |
| 6,706,193 B1 | 3/2004 | Burkard |
| 6,743,508 B2 | 6/2004 | Kono |
| 6,794,487 B2 | 9/2004 | Hiraga |
| 6,794,550 B2 | 9/2004 | Hintzer |
| 6,812,310 B2 | 11/2004 | Grootaert et al. |
| 6,838,545 B2 | 1/2005 | Chapman |
| 6,869,997 B2 | 3/2005 | Wille |
| 7,018,541 B2 | 3/2006 | Hintzer |
| 7,060,772 B2 | 6/2006 | Hintzer |
| 7,105,619 B2 | 9/2006 | Kono et al. |
| 7,122,609 B2 | 10/2006 | Earnest, Jr. |
| 7,126,056 B2 | 10/2006 | Earnest, Jr. |
| 7,208,569 B2 | 4/2007 | Chapman, Jr. |
| 7,214,740 B2 | 5/2007 | Lochhaas |
| 7,435,786 B2 | 10/2008 | Earnest, Jr. |
| 7,473,848 B2 | 1/2009 | Kenny |
| 7,482,415 B2 | 1/2009 | Tatemoto et al. |
| 7,560,517 B2 | 7/2009 | Hintzer |
| 7,579,418 B2 | 8/2009 | DeFeo |
| 7,638,709 B2 | 12/2009 | Kenny |
| 7,671,112 B2 | 3/2010 | Hintzer |
| 7,795,539 B2 | 9/2010 | Thuot |
| 7,923,519 B2 | 4/2011 | Kono |
| 8,058,556 B2 | 11/2011 | Ishii et al. |
| 8,076,431 B2 | 12/2011 | Earnest |
| 8,153,701 B2 | 4/2012 | Venkataraman |
| 8,178,592 B2 | 5/2012 | Burch |
| 8,354,461 B2 | 1/2013 | Venkataraman |
| 8,674,042 B2 | 3/2014 | Earnest |
| 9,156,926 B2 | 10/2015 | Lochhaas |
| 9,212,279 B2 | 12/2015 | Fukushi et al. |
| 9,688,796 B2 | 6/2017 | Hintzer et al. |
| 2003/0004291 A1 * | 1/2003 | Kaulbach ............ C08F 214/262 526/247 |
| 2003/0013791 A1 | 1/2003 | Blong |
| 2003/0026995 A1 | 2/2003 | Duchesne |
| 2003/0153699 A1 | 8/2003 | Ameduri |
| 2003/0153701 A1 | 8/2003 | Kono |
| 2003/0192826 A1 | 10/2003 | Wang |
| 2004/0242783 A1 | 12/2004 | Yabu |
| 2005/0037265 A1 | 2/2005 | Watakabe |
| 2005/0130006 A1 | 6/2005 | Hoshi et al. |
| 2005/0228127 A1 | 10/2005 | Tatemoto et al. |
| 2006/0199898 A1 | 9/2006 | Funaki |
| 2006/0223924 A1 | 10/2006 | Tsuda |
| 2006/0281946 A1 | 12/2006 | Morita |
| 2007/0015865 A1 | 1/2007 | Hintzer |
| 2007/0060699 A1 | 3/2007 | Tsuda |
| 2007/0117915 A1 | 5/2007 | Funaki |
| 2007/0142513 A1 | 6/2007 | Tsuda |
| 2007/0142541 A1 | 6/2007 | Hintzer |
| 2010/0212929 A1 | 8/2010 | Ishii |
| 2010/0326697 A1 | 12/2010 | Venkataraman |
| 2011/0172338 A1 | 7/2011 | Murakami |
| 2011/0303868 A1 * | 12/2011 | Sienkiewicz .............. C08J 5/22 252/62.2 |
| 2012/0289616 A1 | 11/2012 | Arcella et al. |
| 2014/0255703 A1 * | 9/2014 | Aten .................... B32B 15/082 428/421 |
| 2015/0353700 A1 | 12/2015 | Isaka et al. |
| 2018/0030183 A1 | 2/2018 | Duchesne |
| 2018/0030184 A1 | 2/2018 | Duchesne |
| 2018/0057625 A1 | 3/2018 | Hintzer |
| 2018/0066090 A1 | 3/2018 | Duchesne |

FOREIGN PATENT DOCUMENTS

| | | |
|---|---|---|
| GB | 2459672 | 11/2009 |
| JP | S52-005888 | 1/1977 |
| JP | 7-145362 | 6/1995 |
| JP | 2004-018673 | 1/2004 |
| JP | 2004-244504 | 9/2004 |
| WO | WO 2009-102660 | 8/2009 |

OTHER PUBLICATIONS

Cheremisinoff, "Encyclopedia of Fluid Mechanics", 209-242, (1990).

Cogswell, Polymer Melt Rheology, 6pgs (1981).

Nelson, "High End-Group Containing FEP for Improved Bond between FEP Coating and Substrate", IP.com, Dec. 2008, 4pgs.

Scheirs, Modern Fluoropolymers—High Performance Polymers for Diverse Applications, 240-255 (1997).

Scheirs, Modern Fluoropolymers—High Performance Polymers for Diverse Applications, 224-237 (1997).

Teng, "Overview of the development of the fluoropolymer industry", .Applied Sciences, 2012, vol. 2, pp. 496-512.

Tuminello, "Molecular Weight and Molecular Weight Distribution from Dynamic Measurements of Polymer Melts", *Polym. Eng. Sci.* Oct. 1986, vol. 26, No. 19, pp. 1339-1347.

International Search report for PCT international Application No. PCT/US2016/017715 dated May 31, 2016, 4 pages.

European Search report for EP Application No. 16 749 946.6, dated Jun. 13, 2018, 4 pages.

Yinghao Luan, et al., Journal of Functional Polymers, "Preparation and Properties of Perfluorosulfonated Membrane", pp. 1-4, Mar. 31, 2005.

* cited by examiner

TETRAFLUOROETHYLENE/HEXAFLUOROPROPYLENE COPOLYMERS HAVING PENDANT SULFONYL GROUPS

CROSS-REFERENCE TO RELATED APPLICATIONS

This application is a national stage filing under 35 U.S.C. 371 of PCT/US2016/017715, filed Feb. 12, 29016, which claims priority to U.S. Provisional Application Nos. 62/115,476; 62/115,462; and 62/115,470, filed Feb. 12, 2015, the disclosures of which are incorporated by reference in their entirety herein.

BACKGROUND

Melt processable copolymers of tetrafluoroethylene (TFE) and hexafluoropropylene (HFP), known under the name FEP (that is, fluorinated ethylene-propylene copolymer), have useful properties such as chemical resistance, weather resistance, low flammability, thermal stability, and excellent electrical properties. Such beneficial properties render these fluoropolymers useful, for example, in articles such as tubes, pipes, foils, and films. Various embodiments of FEP copolymers have been reported useful as coatings for wires and cables. See, for example, U.S. Pat. Nos. 5,677,404 and 5,703,185, each to Blair; U.S. Pat. No. 6,541,588 (Kaulbach); U.S. Pat. Nos. 6,743,508 and 7,923,519, each to Kono; and U.S. Pat. Nos. 7,122,609 and 7,126,056, each to Earnest. Certain TFE and FEP copolymers have been reported to be useful as polymer processing additives. See, for example, U.S. Pat. No. 5,089,200 (Chapman et al.) and U.S. Pat. No. 5,010,130 (Chapman et al.).

Using perfluoroalkoxyalkyl vinyl ethers as comonomers with tetrafluoroethylene has been reported in U.S. Pat. No. 7,060,772 (Hintzer).

SUMMARY

The present disclosure provides tetrafluoroethylene (TFE) copolymers useful, for example, for wire coating. With a melt flow index (MFI) of 30±10, the copolymer can typically be extruded at high speed. With a sulfonyl groups incorporated along the polymer backbone, a balance of excellent adhesion to metal and thermal stability useful for high-temperature and high-speed extrusion can be achieved.

In one aspect, the present disclosure provides a copolymer having tetrafluoroethylene units, hexafluoropropylene units, and units independently represented by formula

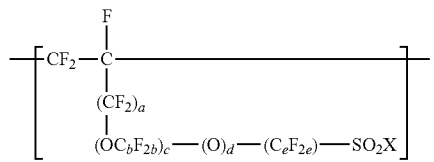

in a range from 0.001 to 2 mole percent, based on the total amount of the copolymer. In these units, a is 0 or 1, each b is independently from 1 to 4, c is 0 to 4, d is 0 or 1, and e is 1 to 6. In the $-SO_2X$ groups, X is independently $-F$, $-NH_2$, $-OH$, or $-OZ$, wherein Z is independently a metallic cation or a quaternary ammonium cation. The copolymer has a melt flow index in a range from 20 grams per 10 minutes to 40 grams per 10 minutes.

In another aspect, the present disclosure provides a method of making an extruded article. The method includes extruding a melted composition that includes the copolymer described above. In some embodiments, the melted composition consists of the copolymer described above. In some embodiments, the extruded article is a film, tube, pipe, or hose. In some embodiments, the melted composition is extruded onto a conductor. In some embodiments, the melted composition is extruded onto a cable.

In another aspect, the present disclosure provides an extruded article that includes the copolymer described above. In some embodiments, the extruded article is a film, tube, pipe, or hose. In some embodiments, the extruded article is a conductor having the copolymer extruded on it. In some embodiments, the extruded article is a cable having the copolymer extruded on it.

In another aspect, the present disclosure provides a method of making the copolymer described above. The method includes copolymerizing components that include tetrafluoroethylene, hexafluoropropylene, and at least one compound independently represented by formula $CF_2=CF(CF_2)_a-(OC_bF_{2b})_c-(O)_d-(C_eF_{2e})-SO_2X$, in which a is 0 or 1, each b is independently from 1 to 4, c is 0 to 4, d is 0 or 1, e is 1 to 6, and X is independently $-F$, $-NH_2$, $-OH$, or $-OZ$, wherein Z is independently a metallic cation or a quaternary ammonium cation. Copolymerizing may be carried out, for example, by aqueous emulsion polymerization or suspension polymerization.

In embodiments in which the fluoropolymer is in contact with a metal, the $-SO_2X$ groups in the copolymers disclosed herein can provide excellent adhesion to metal. The $-SO_2X$ groups in the copolymers disclosed herein are more stable than $-COOM$, $-CH_2OH$, $-COF$, and $-CONH_2$, referred to herein as unstable end groups. Thus, $-SO_2X$ groups do not cause discoloration, which is typically observed when polymers having unstable end groups are processed. Furthermore, post-fluorination is useful for eliminating unstable end groups without removing the $-SO_2X$ groups in the copolymers disclosed herein.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The terms "perfluoro" and "perfluorinated" refer to groups in which all C—H bonds are replaced by C—F bonds.

The phrase "interrupted by at least one —O— group", for example, with regard to a perfluoroalkyl or perfluoroalkylene group refers to having part of the perfluoroalkyl or perfluoroalkylene on both sides of the —O— group. For example, $-CF_2CF_2-O-CF_2-CF_2-$ is a perfluoroalkylene group interrupted by an —O—.

All numerical ranges are inclusive of their endpoints and nonintegral values between the endpoints unless otherwise stated (e.g., 1 to 5 includes 1, 1.5, 2, 2.75, 3, 3.80, 4, 5, etc.).

DETAILED DESCRIPTION

The copolymer according to the present disclosure may be useful for a variety of applications. For example, copolymers according to the present disclosure are useful for insulating cable or wire. Such insulated cable may be useful, for example, as a communication cable (e.g., a data transmission cable such as a "Local Area Network" (LAN) cable). In general, the insulated cable can be manufactured by extrusion coating molten copolymer in the shape of a tube and then drawing down the copolymer by inserting a core wire through the center portion of the resin tube in its axial direction. The term "draw-down" as used herein means extending a molten resin extruded from a die having an opening of relatively large sectional area to its final intended dimensions. The draw-down is characterized by a draw-down ratio (DDR), which is the ratio of the sectional area of the opening of the die to the sectional area of the insulated material of the final product. In general, the draw-down ratio is suitably from 50 to 150.

The copolymer according to the present disclosure is a copolymer of tetrafluoroethylene (TFE) and hexafluoropropylene (HFP). The copolymers according to the present disclosure are at least partially crystalline fluoroplastics. A person skilled in the art can select the amount of HFP to include in the copolymer to make an at least partially crystalline fluoroplastic. The HFP may be present in a range from 5 weight percent (wt. %) to 22 wt. %, in a range from 10 wt. % to 17 wt. %, in a range from 11 wt. % to 16 wt. %, or in a range from 11.5 wt. % to 15.8 wt. %, based on the total weight of the copolymer.

The copolymer according to the present disclosure further includes copolymerized units comprising —SO$_2$X groups independently represented by formula

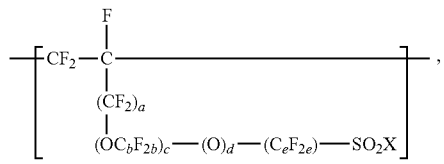

in which a is 0 or 1, each b is independently from 1 to 4, c is 0 to 4, d is 0 or 1, e is 1 to 6, and X is independently —F, —NH$_2$, —OH, or —OZ, wherein Z is independently a metallic cation (e.g., an alkali-metal cation such as sodium or potassium) or a quaternary ammonium cation (e.g., tetraalkyl ammonium, wherein alkyl has from 1 to 4, 1 to 3, or 1 to 2 carbon atoms). In some embodiments, X is independently —F, —OH or —OZ. In some embodiments, X is independently —OH or —OZ. In some of these embodiments, Z is a metal cation (e.g., an alkali-metal cation such as sodium or potassium). In some embodiments, b is 1 to 3, 1 to 2, or 1. In some embodiments, c is 0, 1, or 2; 1 or 2; or 0 or 1. In some embodiments, e is 1 to 4, 1 to 3, or 1 to 2. In some embodiments, c is 0, d is 1, and e is 1 to 4. In some embodiments, a is 0, OC$_b$F$_{2b}$ is OCF$_2$CF(CF$_3$), c is 1 or 2, d is 1, and e is 1 to 4. In some embodiments, a is 1, b is 1, c is 0 to 4, d is 1, e is 1 to 4. C$_e$F$_{2e}$ may be linear or branched. In some embodiments, C$_e$F$_{2e}$ can be written as (CF$_2$)$_e$, which refers to a linear perfluoroalkylene group. When c is 2, the b in the two C$_b$F$_{2b}$ groups may be independently selected. However, within a C$_b$F$_{2b}$ group, a person skilled in the art would understand that b is not independently selected.

These units comprising —SO$_2$X groups may be incorporated into the copolymer by including one or more olefin monomers independently represented by formula CF$_2$=CF(CF$_2$)$_a$—(OC$_b$F$_{2b}$)$_c$—(O)$_d$—(C$_e$F$_{2e}$)—SO$_2$X, wherein a, b, c, d, e, and X are as defined above, in the components that are copolymerized. Examples of suitable olefin monomers represented by formula CF$_2$=CF(CF$_2$)$_a$—(OC$_b$F$_{2b}$)$_c$—(O)$_d$—(C$_e$F$_{2e}$)—SO$_2$X include CF$_2$=CF—CF$_2$—SO$_2$X, CF$_2$=CF—O—CF$_2$—CF$_2$—SO$_2$X, CF$_2$=CF—CF$_2$—O—CF$_2$—CF$_2$—SO$_2$X, CF$_2$=CF—O—(CF$_2$)$_4$—SO$_2$X, CF$_2$=CF—CF$_2$—O—(CF$_2$)$_4$—SO$_2$X, and CF$_2$=CF—O—CF$_2$—CF(CF$_3$)—O—CF$_2$—CF$_2$—SO$_2$X. Certain of these olefin monomers are commercially available. Others may be prepared by known methods. See, for example, U.S. Pat. No. 3,282,875 (Connolly), U.S. Pat. No. 3,718,627 (Grot), U.S. Pat. No. 4,267,364 (Grot), and U.S. Pat. No. 4,273,729 (Krespan).

The copolymerized units independently represented by formula:

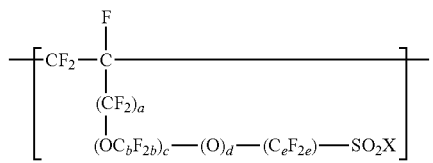

are present in the copolymer according to the present disclosure in a range from 0.001 mole percent to 2 mole percent, based on the total amount of the copolymer. In some embodiments, the copolymerized units represented by this formula are present in the copolymer in an amount up to 1.5, 1.0, 0.5, 0.4, 0.3, 0.25, or 0.2 mole percent, based on the total amount of the copolymer. In some embodiments, the copolymerized units represented by this formula are present in the copolymer in an amount less than 0.5 mole percent, based on the total amount of the copolymer. In some embodiments, the copolymerized units represented by this formula are present in the copolymer in an amount of at least 0.003 mole percent, 0.005 mole percent, or 0.01 mole percent. The copolymerized units may be present in the copolymer in a range from 0.001 mole percent to 2 mole percent, 0.003 mole percent to 1.5 mole percent, 0.005 mole percent to 0.5 mole percent, or 0.005 mole percent to 0.45 mole percent. Copolymers according to the present disclosure may include any combination of one or more of these copolymerized units according to any of the above embodiments.

In some embodiments, the copolymer according to the present disclosure further includes units independently represented by formula:

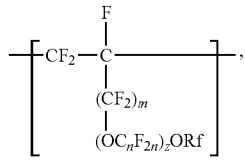

in which m is 0 or 1, each n is independently from 1 to 6, z is 0, 1, or 2, and Rf is a linear or branched perfluoroalkyl group having from 1 to 8 carbon atoms and optionally interrupted by one or more —O— groups. In some embodiments, m is 0, and z is 1 or 2. In some of these embodiments, n is from 1 to 4, or from 1 to 3, or from 2 to 3, or from 2 to 4. In some embodiments, n is 1 or 3. In some embodiments, n is 3. When z is 2, the n in the two C$_n$F$_{2n}$ groups may be independently selected. However, within a C$_n$F$_{2n}$ group, a person skilled in the art would understand that n is not independently selected. $C_nF_{2n}$ may be linear or branched. In some embodiments, $C_nF_{2n}$ can be written as $(CF_2)_n$, which refers to a linear perfluoroalkylene group. In some embodiments, $C_nF_{2n}$ is $—CF_2—CF_2—CF_2—$. In some embodiments, $C_nF_{2n}$ is branched, for example, $—CF_2—CF(CF_3)—$. In some embodiments, $(OC_nF_{2n})_z$ is represented by $—O—(CF_2)_{1-4}—[O(CF_2)_{1-4}]_{0-1}$. In some embodiments, Rf is a linear or branched perfluoroalkyl group having from 1 to 8 (or 1 to 6) carbon atoms that is optionally interrupted by up to 4, 3, or 2 —O— groups. In some embodiments, Rf is a perfluoroalkyl group having from 1 to 4 carbon atoms optionally interrupted by one —O— group.

In embodiments in which m is 0 and z is 1 or 2, copolymers according to the present disclosure are prepared by including at least one perfluoroalkoxyalkyl vinyl ether independently represented by formula $CF_2=CF(OC_nF_{2n})_zORf$, in which n and Rf are as defined above in any of their embodiments, in the components that are copolymerized. Examples of suitable perfluoroalkoxyalkyl vinyl ethers include $CF_2=CFOCF_2OCF_3$, $CF_2=CFOCF_2OCF_2CF_3$, $CF_2=CFOCF_2CF_2OCF_3$, $CF_2=CFOCF_2CF_2CF_2OCF_3$, $CF_2=CFOCF_2CF_2OCF_2CF_3$, $CF_2=CFOCF_2CF_2CF_2OCF_2CF_3$, $CF_2=CFOCF_2CF_2CF_2OCF_2CF_2CF_3$, $CF_2=CFOCF_2CF_2OCF_2OCF_3$, $CF_2=CFOCF_2CF_2OCF_2CF_2OCF_3$, $CF_2=CFOCF_2CF_2OCF_2CF_2CF_2OCF_3$, $CF_2=CFOCF_2CF_2OCF_2CF_2CF_2CF_2OCF_3$, $CF_2=CFOCF_2CF_2(OCF_2)_3OCF_3$, $CF_2=CFOCF_2CF_2(OCF_2)_4OCF_3$, $CF_2=CFOCF_2CF_2OCF_2OCF_2OCF_3$, $CF_2=CFOCF_2CF_2OCF_2CF_2CF_3$, $CF_2=CFOCF_2CF_2OCF_2CF_2OCF_2CF_2CF_3$, $CF_2=CFOCF_2CF(CF_3)—O—C_3F_7$ (PPVE-2), $CF_2=CF(OCF_2CF(CF_3))_2—O—C_3F_7$ (PPVE-3), and $CF_2=CF(OCF_2CF(CF_3))_3—O—C_3F_7$ (PPVE-4). Many of these perfluoroalkoxyalkyl vinyl ethers can be prepared according to the methods described in U.S. Pat. No. 6,255,536 (Worm et al.) and U.S. Pat. No. 6,294,627 (Worm et al.). It should be understood that for embodiments in which m is 0 and z is 1, the units copolymerized with tetrafluoroethylene units are represented by formula:

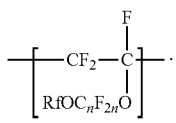

In some embodiments of the copolymer according to the present disclosure that include units represented by formula

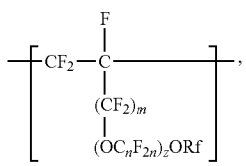

m is 1, z is 1 or 2, and n and Rf are as defined above in any of their embodiments. In these embodiments, the copolymers are prepared by including at least one perfluoroalkoxyalkyl allyl ether independently represented by formula $CF_2=CFCF_2(OC_nF_{2n})_zORf$, in which n and Rf are as defined above in any of their embodiments, in the components that are copolymerized. Examples of suitable perfluoroalkoxyalkyl allyl ethers include $CF_2=CFCF_2OCF_2CF_2OCF_3$, $CF_2=CFCF_2OCF_2CF_2CF_2OCF_3$, $CF_2=CFCF_2OCF_2OCF_3$, $CF_2=CFCF_2OCF_2OCF_2CF_3$, $CF_2=CFCF_2OCF_2CF_2CF_2CF_2OCF_3$, $CF_2=CFCF_2OCF_2CF_2OCF_2CF_3$, $CF_2=CFCF_2OCF_2CF_2CF_2OCF_2CF_3$, $CF_2=CFCF_2OCF_2CF_2CF_2CF_2OCF_2CF_3$, $CF_2=CFCF_2OCF_2CF_2OCF_2OCF_3$, $CF_2=CFCF_2OCF_2CF_2OCF_2CF_2OCF_3$, $CF_2=CFCF_2OCF_2CF_2OCF_2CF_2CF_2OCF_3$, $CF_2=CFCF_2OCF_2CF_2OCF_2CF_2CF_2CF_2OCF_3$, $CF_2=CFCF_2OCF_2CF_2OCF_2CF_2CF_2CF_2CF_2OCF_3$, $CF_2=CFCF_2OCF_2CF_2(OCF_2)_3OCF_3$, $CF_2=CFCF_2OCF_2CF_2(OCF_2)_4OCF_3$, $CF_2=CFCF_2OCF_2CF_2OCF_2OCF_2OCF_3$, $CF_2=CFCF_2OCF_2CF_2OCF_2CF_2CF_3$, $CF_2=CFCF_2OCF_2CF_2OCF_2CF_2OCF_2CF_2CF_3$, $CF_2=CFCF_2OCF_2CF(CF_3)—O—C_3F_7$, and $CF_2=CFCF_2(OCF_2CF(CF_3))_2—O—C_3F_7$. Many of these perfluoroalkoxyalkyl allyl ethers can be prepared, for example, according to the methods described in U.S. Pat. No. 4,349,650 (Krespan).

In some embodiments of the copolymer according to the present disclosure that include units represented by formula

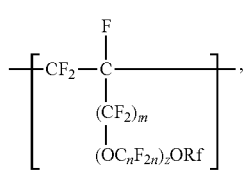

m and z are each 0. It should be understood that when m and z are each 0, the units copolymerized with tetrafluoroethylene units are represented by formula:

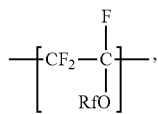

in which Rf is a linear or branched perfluoroalkyl group having from 1 to 8 carbon atoms optionally interrupted by one or more —O— groups. In some of these embodiments, Rf is a linear or branched perfluoroalkyl group having from 1 to 8 carbon atoms (that is, not interrupted by one or more —O— groups). In some embodiments, Rf is a linear or branched perfluoroalkyl group having from 1 to 6, 1 to 5, 1 to 4, or 1 to 3 carbon atoms. These units are typically incorporated into the copolymer by including perfluoroalkyl vinyl ethers [e.g., perfluoromethyl vinyl ether $(CF_2=CFOCF_3)$, perfluoroethyl vinyl ether $(CF_2=CFOCF_2CF_3)$, and perfluoropropyl vinyl ether $(CF_2=CFOCF_2CF_2CF_3)$] in the components that are copolymerized. In other embodiments, the copolymers according to the present disclosure are substantially free of such perfluoroalkyl vinyl ether-derived units. For example, the copolymer can include up to 0.02, 0.01, or 0.005 mole percent of such perfluoroalkyl vinyl ether-derived units. The term "substantially free of" also includes copolymers that include none of these perfluoroalkyl vinyl ether-derived units.

In some embodiments of the copolymer according to the present disclosure that include units represented by formula

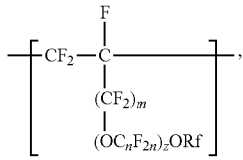

m is 1, z is 0, and Rf is as defined above in any of its embodiments. In these embodiments, copolymers according to the present disclosure can be prepared by including at least one perfluoroalkyl allyl ether independently represented by formula $CF_2$=$CFCF_2ORf$, in which Rf is as defined above in any of its embodiments, in the components that are copolymerized. Examples of suitable perfluoroalkyl allyl ethers include $CF_2$=$CF$—$CF_2$—$O$—$CF_3$, $CF_2$=$CF_2$—$CF_2$—$O$—$C_2F_5$, and $CF_2$=$CF$—$CF_2$—$O$—$C_3F_7$.

The copolymerized units independently represented by formula:

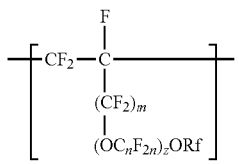

may be present in the copolymer according to the present disclosure in a range from 0.02 mole percent to 2 mole percent, based on the total amount of the copolymer. In some embodiments, the copolymerized units represented by this formula are present in the copolymer in an amount up to 1.5 mole percent or up to 1.0 mole percent. In some embodiments, the copolymerized units represented by this formula are present in the copolymer in an amount of at least 0.03 mole percent or 0.05 mole percent. The copolymerized units may be present in the copolymer in a range from 0.02 mole percent to 2 mole percent, 0.03 mole percent to 1.5 mole percent, or 0.05 mole percent to 1.0 mole percent. Copolymers according to the present disclosure may include any combination of one or more of these copolymerized units according to any of the above embodiments.

In some embodiments, the copolymerized units independently represented by formula:

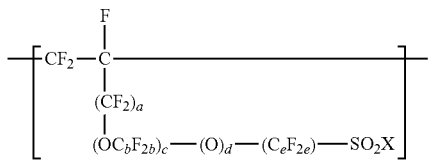

and the copolymerized units independently represented by formula:

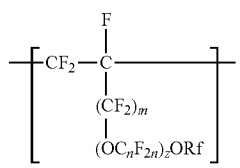

are present in the copolymer according to the present disclosure in a combined amount from 0.02 mole percent to 2 mole percent, based on the total amount of the copolymer. In some embodiments, the copolymerized units represented by these formulas are present in the copolymer in a combined amount up to 1.5 mole percent or up to 1.0 mole percent. In some embodiments, the copolymerized units represented by these formulas are present in the copolymer in a combined amount of at least 0.03 mole percent or 0.05 mole percent. The copolymerized units represented by these formulas may be present in the copolymer in a combined amount from 0.02 mole percent to 2 mole percent, 0.03 mole percent to 1.5 mole percent, or 0.05 mole percent to 1.0 mole percent. In any of these embodiments, the copolymerized units containing —$SO_2X$ groups are present in an amount of at least 0.001 mole percent, based on the total amount of the copolymer.

In some embodiments, the copolymers according to the present disclosure have a melting point between 220° C. to 285° C., in some embodiments, 235° C. to 275° C., 240° C. to 275° C., or 245° C. to 265° C.

The molecular weights of certain fluoroplastics are often characterized by the melt viscosity or the melt flow index (MFI; e.g., 372° C./5 kg)). The copolymer according to the present disclosure has an MFI of 30±10 grams per 10 minutes. In some embodiments, the copolymer according to the present disclosure has an MFI of 30±5 grams per 10 minutes or 30±3 grams per 10 minutes. When the MFI is 30±10 grams per 10 minutes, high-speed extrusion is possible, the extruded polymer can be readily drawn down, and melt fracture (that is, abnormal flow and surface roughness of the extruded polymer) is minimized. If the MFI is less than 20 grams per 10 minutes, high extrusion rates are difficult to achieve. Also, an FEP having an MFI of up to about 40 typically performs better under cable burn performance evaluation than FEP copolymers with higher MFIs due to a lower tendency to flow at high temperature. The copolymer according to the present disclosure can be adjusted to have an MFI of 30±10 grams per 10 minutes by adjusting the amount of the initiator and/or chain-transfer agent used during polymerization, both of which affect the molecular weight and molecular-weight distribution of the copolymer. MFI can also be controlled by the rate of addition of initiator to the polymerization. Variations in the monomer composition can also affect the MFI. For the purposes of the present disclosure, MFI is measured according to the test method described in the Examples, below.

At a given MFI, even relatively low levels of a comonomer represented by formula $CF_2$=$CF(CF_2)_a$—$(OC_bF_{2b})_c$—$(O)_d$—$(CF_2)_e$—$SO_2X$ and optionally a comonomer represented by formula $CF_2$=$CF(CF_2)_m(OC_nF_{2n})_zORf$ as described herein in any of their embodiments can improve the properties of an FEP copolymer. For example, even at low levels, at least one of these comonomers may increase the elongation viscosity of an FEP copolymer and may have a positive effect on the rupture durability and cable burn performance of the FEP copolymer.

The production of foamed insulation cable is different from the high-line-speed production of solid wire insulation, and lower MFIs are useful in the production of foamed insulation cable. Thus, in some embodiments, the copolymer according to the present disclosure is not foamed. In these embodiments, the copolymer generally does not include a foam cell nucleating agent (e.g., a $F(CF_2)_xCH_2CH_2$-sulfonic or phosphonic acid or salt, wherein x is 6, 8, 10, or 12 or a mixture thereof that may or may not be combined with boron nitride). Likewise, in some embodiments of the extruded article according to and/or made according to the present disclosure, the extruded article is not foamed or does not include a foam cell nucleating agent. In some of these embodiments, the extruded article is not a foamed insulation cable.

However, it may be desirable in some applications for the copolymer according to the present disclosure to be foamed. In these embodiments, the copolymer can include a foam cell nucleating agent as described above. Likewise, in some embodiments of the extruded article according to and/or made according to the present disclosure, the extruded article is foamed or includes a foam cell nucleating agent. In some of these embodiments, the extruded article is a foamed insulation cable.

It has been reported in U.S. Pat. No. 4,552,925 (Nakagawa et al.), for example, that high extrusion speed can be achieved for FEP copolymers when the molecular-weight distribution of the copolymer is very broad. To achieve a broad molecular-weight distribution, a mixture of at least two FEP copolymers with largely differing molecular weights (as measured by MFI, for example) can be used. The desired mixtures are often produced by polymerizing the components separately and mixing them in form of the latices, reactor beads, or fluff before melt pelletizing. Thus, the manufacturing of these mixtures is a cumbersome and costly process.

In contrast, in some embodiments, the copolymer according to the present disclosure has a relatively low polydispersity. The polydispersity, which is a ratio of the weight-average molecular weight (Mw) to the number-average molecular weight (Mn) of the copolymer, can be up to about 2.5, 2.3, 2.2, or 2.0. The polydispersity may be as low as 1.5. Polydispersity is measured according to a modified version of the method published by W. H. Tuminello in Polym. Eng. Sci. 26, 1339 (1986), described in the Examples, below.

Copolymers according to the present disclosure can be prepared in a variety of ways. Conveniently, the method of making the copolymer according to the present disclosure includes radical aqueous emulsion polymerization.

When conducting emulsion polymerization, perfluorinated or partially fluorinated emulsifiers may be useful. Generally these fluorinated emulsifiers are present in a range from about 0.02% to about 3% by weight with respect to the polymer. Polymer particles produced with a fluorinated emulsifier typically have an average diameter, as determined by dynamic light scattering techniques, in range of about 10 nanometers (nm) to about 300 nm, and in some embodiments in range of about 50 nm to about 200 nm. Examples of suitable emulsifiers include perfluorinated and partially fluorinated emulsifier having the formula $[R_f-O-L-COO^-]_iX^{i+}$ wherein L represents a linear partially or fully fluorinated alkylene group or an aliphatic hydrocarbon group, $R_f$ represents a linear partially or fully fluorinated aliphatic group or a linear partially or fully fluorinated aliphatic group interrupted with one or more oxygen atoms, $X^{i+}$ represents a cation having the valence i and i is 1, 2 or 3. (See, e.g., U.S. Pat. No. 7,671,112 to Hintzer et al.). Additional examples of suitable emulsifiers also include perfluorinated polyether emulsifiers having the formula $CF_3-(OCF_2)_x-O-CF_2-X$, wherein x has a value of 1 to 6 and X represents a carboxylic acid group or salt thereof, and the formula $CF_3-O-(CF_2)_3-(OCF(CF_3)-CF_2)_y-O-L-Y$ wherein y has a value of 0, 1, 2 or 3, L represents a divalent linking group selected from $-CF(CF_3)-$, $-CF_2-$, and $-CF_2CF_2-$, and Y represents a carboxylic acid group or salt thereof (See, e.g., U.S. Pat. Publ. No. 2007/0015865 to Hintzer et al.). Other suitable emulsifiers include perfluorinated polyether emulsifiers having the formula $R_f-O(CF_2CF_2O)_xCF_2COOA$ wherein $R_f$ is $C_bF_{(2b+1)}$; where b is 1 to 4, A is a hydrogen atom, an alkali metal or $NH_4$, and x is an integer of from 1 to 3. (See, e.g., U.S. Pat. Publ. No. 2006/0199898 to Funaki et al.). Suitable emulsifiers also include perfluorinated emulsifiers having the formula $F(CF_2)_bO(CF_2CF_2O)_xCF_2COOA$ wherein A is a hydrogen atom, an alkali metal or $NH_4$, b is an integer of from 3 to 10, and x is 0 or an integer of from 1 to 3. (See, e.g., U.S. Pat. Publ. No. 2007/0117915 to Funaki et al.). Further suitable emulsifiers include fluorinated polyether emulsifiers as described in U.S. Pat. No. 6,429,258 to Morgan et al. and perfluorinated or partially fluorinated alkoxy acids and salts thereof wherein the perfluoroalkyl component of the perfluoroalkoxy has 4 to 12 carbon atoms, or 7 to 12 carbon atoms. (See, e.g., U.S. Pat. No. 4,621,116 to Morgan). Suitable emulsifiers also include partially fluorinated polyether emulsifiers having the formula $[R_f-(O)_t-CHF-(CF_2)_x-COO-]_iX^{i+}$ wherein $R_f$ represents a partially or fully fluorinated aliphatic group optionally interrupted with one or more oxygen atoms, t is 0 or 1 and x is 0 or 1, $X^{i+}$ represents a cation having a valence i and i is 1, 2 or 3. (See, e.g., U.S. Pat. Publ. No. 2007/0142541 to Hintzer et al.). Further suitable emulsifiers include perfluorinated or partially fluorinated ether-containing emulsifiers as described in U.S. Pat. Publ. Nos. 2006/0223924, 2007/0060699, and 2007/0142513, each to Tsuda et al. and 2006/0281946 to Morita et al. Fluoroalkyl, for example, perfluoroalkyl carboxylic acids and salts thereof having 6-20 carbon atoms, such as ammonium perfluorooctanoate (APFO) and ammonium perfluorononanoate (see, e.g., U.S. Pat. No. 2,559,752 to Berry) may also be useful.

If desired, the emulsifiers can be removed or recycled from the fluoropolymer latex as described in U.S. Pat. No. 5,442,097 to Obermeier et al., U.S. Pat. No. 6,613,941 to Felix et al., U.S. Pat. No. 6,794,550 to Hintzer et al., U.S. Pat. No. 6,706,193 to Burkard et al., and U.S. Pat. No. 7,018,541 to Hintzer et al.

In some embodiments of the method of making the copolymer according to the present disclosure, the polymerization process may be conducted with no emulsifier or with no fluorinated emulsifier.

In some embodiments of the method of making the copolymer according to the present disclosure, a water-soluble initiator can be useful to start the polymerization process. Salts of peroxy sulfuric acid, such as ammonium persulfate or potassium persulfate, are typically applied either alone or sometimes in the presence of a reducing agent, such as bisulfites or sulfinates (e.g., fluorinated sulfinates disclosed in U.S. Pat. Nos. 5,285,002 and 5,378,782, both to Grootaert) or the sodium salt of hydroxy methane sulfinic acid (sold under the trade designation "RONGALIT", BASF Chemical Company, New Jersey, USA). The choice of initiator and reducing agent, if present, will affect the end groups of the copolymer. The concentration range for the initiators and reducing agent can vary from 0.01% to 5% by weight based on the aqueous polymerization medium.

In some embodiments, the copolymers according to the present disclosure include —SO$_2$X end groups, wherein X is as described above in any of its embodiments. Such end groups can be introduced by generating SO$_3^-$ radicals during the polymerization process. When salts of peroxy sulfuric acid are used in the presence of a sulfite or bisulfite salt (e.g., sodium sulfite or potassium sulfite), SO$_3^-$ radicals are generated during the polymerization process, resulting in —SO$_3^-$ end groups. By altering the stoichiometry of the sulfite or bisulfite salt versus the peroxy sulfuric acid salt, one can vary the amount of –SO$_2$X end groups.

Most of the initiators and emulsifiers described above have an optimum pH-range where they show most efficiency. For this reason, buffers are sometimes useful. Buffers include phosphate, acetate, or carbonate (e.g., (NH$_4$)$_2$CO$_3$ or NaHCO$_3$) buffers or any other acid or base, such as ammonia or alkali-metal hydroxides. The concentration range for the buffers can vary from 0.01% to 5% by weight based on the aqueous polymerization medium.

In some embodiments, the copolymers according to the present disclosure may include up to 100 ppm, 150 ppm, or more alkali-metal cations or alkaline-earth-metal cations. When alkali-metal salts or bases are used as initiators or buffers, for example, the copolymer according to the present disclosure generally comprises at least 50 ppm alkali-metal cations. In other embodiments of the method of making the copolymer according to the present disclosure, polymerization is conducted in the absence of added alkali-metal cations. In these embodiments, potassium persulfate, a common alternative initiator or co-initiator with ammonium persulfate, is not used. It is also possible to use organic initiators as disclosed in U.S. Pat. No. 5,182,342 (Feiring et al.). The copolymer produced can have less than 50 ppm alkali-metal cations, in some embodiments, less than 25 ppm, less than 10 ppm, or less than 5 ppm alkali-metal cations. To achieve such low alkali-metal content, the water for polymerization and washing may be deionized. Minimizing the alkali-metal salt concentration in the copolymer may minimize the formation of die drool that may form during a high speed conductor coating operation on the outer surface of an extrusion die or on the guider tip inside the die. This die drool, if not minimized, can be periodically carried along the melt and/or conductor to form undesirable lumps and may cause cone-breaks.

The alkali-metal ion content of the copolymer can be measured by flame atomic absorption spectrometry after combusting the copolymer and dissolving the residue in an acidic aqueous solution according to the method described in the Examples, below. For potassium as the analyte, the lower detection limit is less than 1 ppm.

Typical chain-transfer agents like H$_2$, lower alkanes, alcohols, ethers, esters, and methylene fluoride may be useful in the preparation of the copolymer according to the present disclosure. Termination primarily via chain transfer results in a polydispersity of about 2 or less. In some embodiments of the method according to the present disclosure, the polymerization is carried out without any chain-transfer agents. A lower polydispersity can sometimes be achieved in the absence of chain-transfer agents. Recombination typically leads to a polydispersity of about 1.5 for small conversions.

Useful polymerization temperatures can range from 40° C. to 120° C. Typically, polymerization is carried out in a temperature range from 40° C. to 100° C. or 50° C. to 80° C. The polymerization pressure is usually in the range from 0.8 MPa to 2.5 MPa, and in some embodiments in the range from 1.0 MPa to 2.0 MPa. HFP can be precharged and fed into the reactor as described, for example, in *Modern Fluoropolymers*, ed. John Scheirs, Wiley & Sons, 1997, p. 241. Comonomers represented by formula CF$_2$=CF(CF$_2$)$_a$—(OC$_b$F$_{2b}$)$_c$—(O)$_d$—(CF$_2$)$_e$—SO$_2$X, wherein a, b, c, d, e, and X are as defined above in any of their embodiments, and perfluorinated vinyl or allyl ethers represented by formula CF$_2$=CF(CF$_2$)$_m$(OC$_n$F$_{2n}$)$_z$ORf, wherein m, n, z, and Rf are as defined above in any of their embodiments, are typically liquids and may be sprayed into the reactor or added directly, vaporized, or atomized. Comonomers represented by formula CF$_2$=CF(CF$_2$)$_a$—(OC$_b$F$_{2b}$)$_c$—(O)$_d$—(CF$_2$)$_e$—SO$_2$X and perfluorinated vinyl or allyl ethers represented by formula CF$_2$=CF(CF$_2$)$_m$(OC$_n$F$_{2n}$)$_z$ORf may also be pre-emulsified with an emulsifier before being combined with the other comonomers, for example, before addition of a gaseous fluoroolefin.

The obtained polymer dispersion after aqueous emulsion polymerization can be used as is or, if higher solids are desired, can be upconcentrated. To coagulate the obtained fluoropolymer latex, any coagulant which is commonly used for coagulation of a fluoropolymer latex may be used, and it may, for example, be a water-soluble salt (e.g., calcium chloride, magnesium chloride, aluminum chloride or aluminum nitrate), an acid (e.g., nitric acid, hydrochloric acid or sulfuric acid), or a water-soluble organic liquid (e.g., alcohol or acetone). The amount of the coagulant to be added may be in a range of 0.001 to 20 parts by mass, for example, in a range of 0.01 to 10 parts by mass per 100 parts by mass of the fluoropolymer latex. Alternatively or additionally, the fluoropolymer latex may be frozen for coagulation or mechanically coagulated, for example, with a homogenizer as described in U.S. Pat. No. 5,463,021 (Beyer et al.). In some embodiments (e.g., in embodiments in which the copolymer comprises less than 50 ppm alkali-metal cation), it is useful to avoid alkali-metal salts as coagulants. It may also be useful to avoid acids and alkaline-earth-metal salts as coagulants to avoid metal contaminants.

The coagulated copolymer can be collected by filtration and washed with water. The washing water may, for example, be ion-exchanged water, pure water, or ultrapure water. The amount of the washing water may be from 1 to 5 times by mass to the copolymer, whereby the amount of the emulsifier attached to the copolymer can be sufficiently reduced by one washing.

The coagulated copolymer may be agglomerated to produce the polymer in agglomerate form. Agglomerates are typically free-flowing spherical beads with an average size (that is, diameter) of 1 mm to 5 mm. If the agglomerates obtained from agglomerating the coagulated copolymer are too small, it may be desirable to compact the agglomerate to produce a compacted agglomerate which will typically have an average size of 1 mm to 10 mm. In some embodiments, the coagulated copolymer is agglomerated with a water-immiscible organic liquid like gasoline as described in *Modern Fluoropolymers*, ed. by John Scheirs, Wiley & Sons, 1997, p. 227. The agglomerate can be dried, for example, by heating under moderate vacuum at temperatures up to 250° C., 200° C., 180° C., 150° C., or 130° C.

In some embodiments of the method of making the copolymer according to the present disclosure, radical polymerization also can be carried out by suspension polymerization. Suspension polymerization will typically produce particle sizes up to several millimeters.

In some embodiments, the copolymer may be melted, extruded, and cut into granulates of a desired size, which may be called melt granulate.

Fluorinated thermoplastics tend to degrade thermally when processed. The thermal degradation takes place predominantly via the thermally unstable end groups formed during the polymerization, that is, from the end of the chain. FEP copolymers obtained by aqueous emulsion polymerization with inorganic initiators (e.g. persulfates, $KMnO_4$, etc.) typically have a high number of unstable carbon-based end groups (e.g. more than 200 —COOM end groups per $10^6$ carbon atoms). During work-up and melt-pelletizing of the tetrafluoroethylene copolymers, the copolymers take on a brownish appearance due to thermal degradation. In these cases, the number of unstable end groups may be unacceptable for further high-speed processing. The mechanism of the degradation of thermally unstable end groups has been described in some detail in *Modern Fluoropolymers*, John Wiley & Sons, 1997, in K. Hintzer and G. Lohr, 'Melt Processable Tetrafluoroethylene-Perfluoropropylvinyl Ether Copolymers (PFA)', page 227f. During the thermal degradation, corrosive gases are produced and considerably impair the quality of the final product via metal contamination or bubble formation, and can corrode tooling and processing machinery. The effect naturally increases as molecular weight decreases and melt flow index increases.

As used herein, the term "unstable end group" in the copolymers according to the present disclosure include —COOM, —$CH_2OH$, —COF, and —$CONH_2$, wherein M is independently an alkyl group, a hydrogen atom, a metallic cation, or a quaternary ammonium cation. In some embodiments, the unstable end groups are —COOM and —COF groups. In some embodiments, the copolymers according to the present disclosure have up to 100 unstable end groups per $10^6$ carbon atoms. In some embodiments, the copolymers according to the present disclosure have up to 75, 50, 40, 30, 25, 20, 15, or 10 unstable end groups per $10^6$ carbon atoms. The number of unstable end groups can be determined by Fourier-transform infrared spectroscopy, as described in the Examples, below.

Various treatments of molten or unmolten fluoropolymer have been proposed to reduce the amount of unstable end groups, resulting in substantial suppression of thermal degradation. When the unstable end groups are acid end groups, —COF or —COOH, the fluoropolymer can be treated with ammonia to form the more stable amide end group —$CONH_2$ or with a primary or secondary amine (e.g., dimethyl, diethyl, or propyl amine) to form amide end groups —CONRH or —$CONR_2$, wherein R is/are the alkyl group(s) of the amine, and wherein for $R_2$, the alkyl groups are the same or different. When the unstable end groups are acid end groups, —COF or —COOH, the fluoropolymer can be treated with an alcohol, such as methanol, ethanol, propanol, or a fluorine-containing alcohol to form the more stable ester —COOR' where R' is the alkyl group supplied by the alcohol. When the unstable end groups are —COF or —COOM, the fluoropolymer can be decarboxylated to form the more stable —$CF_2H$ and —$CF(CF_3)H$ end groups, respectively. Treatment of fluoropolymers at high temperatures (e.g., 400° C.) with water vapor has been shown to reduce the number of unstable end groups, typically forming —$CF_2H$ and —$CF(CF_3)H$ end groups. See, e.g., U.S. Pat. No. 3,085,083 (Schreyer). The method of making the copolymer according to the present disclosure can include any of these methods.

Post-fluorination with fluorine gas is also commonly used to cope with unstable end groups and any concomitant discoloration. Post-fluorination typically results in a melt pelletized copolymer with an excellent color, and the number of unstable end groups is reduced almost to zero. Post-fluorination of the fluoropolymer can convert —COOH, amide, hydride, —COF, and other non-perfluorinated end groups or —CF=$CF_2$ to —$CF_3$ end groups. Converting the thermally unstable end groups into stable —$CF_3$ end groups by post-fluorination of agglomerate or melt granulate has been described, for example, in U.S. Pat. No. 4,743,658 (Imbalzano et al.) and Great Britain Patent GB1210794, published Oct. 28, 1970. A stationary bed of agglomerate may also be fluorinated as described in U.S. Pat. No. 6,693,164 (Blong).

In some embodiments, copolymers according to the present disclosure include —$CF_2H$ and/or —$CF(CF_3)H$ end groups. In some embodiments of the method according to the present disclosure (e.g., when alkali-metal cations are present) the dried polymer contains predominantly —$CF_2H$ and —$CF(CF_3)H$ end groups as described above. —$CF_2H$ and —$CF(CF_3)H$ end groups are sufficiently stable for some applications. However, if post-fluorination is desired to convert some of the —$CF_2H$ and —$CF(CF_3)H$ end groups into —$CF_3$ and —$C_2F_5$ end groups, the post-fluorination is generally easier and faster than when many —COOH end groups are present since a lower number of fluorination cycles is needed to convert the —$CF_2H$ or —$CF(CF_3)H$ end groups in comparison to —COOH end groups.

In some embodiments, the copolymer according to the present disclosure can be prepared by a method including a post-fluorination step after melt-pelletization of the polymer in order to remove unstable, carbon-based end groups (e.g. —COF, COOM, —$CONH_2$, —$CH_2OH$). The post-fluorination can be conveniently carried out with nitrogen/fluorine gas mixtures in ratios of 80-90:20-10 at temperatures between 20° C. and 250° C., in some embodiments in a range of 50° C. to 200° C. or 70° C. to 120° C., and pressures from 1-10 bar. Under these conditions, most unstable carbon-based end groups are removed, whereas —$SO_2X$ groups mostly survive. In some embodiments, the copolymer according to the present disclosure can be prepared by a method including a post-treatment with aqueous ammonia solution after the post-fluorination to obtain —$SO_2NH_2$ groups, a method including a post-treatment with aqueous alkaline hydroxide (e.g. LiOH, NaOH, or KOH) solution to obtain $SO_3$ alkaline-groups or subsequently $SO_3H$ groups, or a method including post-treatment with water and steam to form $SO_3H$ groups.

While in some embodiments, the copolymer according to the present disclosure has relatively few unstable end groups, it is desirable to have a certain amount of polar groups to ensure good adhesion of the polymer to metal surfaces (e.g. copper wires). We have found that copolymers according to the present disclosure, which have stable polar —$SO_2X$ groups, ensure good adhesion to metal surfaces. These copolymers typically have a brilliant color and do not exhibit the brownish appearance that can occur when —COOM end groups thermally degrade.

Some Embodiments of the Disclosure

In a first embodiment, the present disclosure provides a copolymer comprising tetrafluoroethylene units, hexafluoropropylene units, and units independently represented by formula

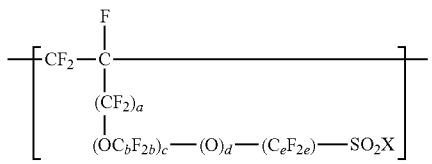

in a range from 0.001 to 2 mole percent, based on the total amount of the copolymer, wherein a is 0 or 1, each b is independently from 1 to 4, c is 0 to 4, d is 0 or 1, e is 1 to 6, and X is independently —F, —$NH_2$, —OH, or —OZ, wherein Z is independently a metallic cation or a quaternary ammonium cation, and wherein the copolymer has a melt flow index in a range from 20 grams per 10 minutes to 40 grams per 10 minutes measured at a temperature of 372° C. and at a support weight of 5.0 kg.

In a second embodiment, the present disclosure provides the copolymer of the first embodiment, wherein c is 0, d is 1, and e is 1 to 4.

In a third embodiment, the present disclosure provides the copolymer of the first embodiment, wherein a is 0, $OC_bF_{2b}$ is $OCF_2CF(CF_3)$, c is 1 or 2, d is 1, and e is 1 to 4.

In a fourth embodiment, the present disclosure provides the copolymer of the first embodiment, wherein a is 1, b is 1, c is 0 to 4, d is 1, e is 1 to 4.

In a fifth embodiment, the present disclosure provides the copolymer of any one of the first to fourth embodiments, wherein the copolymer has up to 100 unstable end groups per $10^6$ carbon atoms, wherein the unstable end groups are selected from —COOM, —$CH_2OH$, —COF, and —$CONH_2$, and wherein M is independently an alkyl group, a hydrogen atom, a metallic cation, or a quaternary ammonium cation.

In a sixth embodiment, the present disclosure provides the copolymer of any one of the first to fifth embodiments having not more than 50 unstable end groups per $10^6$ carbon atoms.

In a seventh embodiment, the present disclosure provides the copolymer of any one of the first to sixth embodiments having not more than 25 unstable end groups per $10^6$ carbon atoms.

In an eighth embodiment, the present disclosure provides the copolymer of any one of the first to seventh embodiments, wherein the copolymer comprises less than 50 ppm alkali-metal cations.

In a ninth embodiment, the present disclosure provides the copolymer of any one of the first to seventh embodiments, wherein the copolymer comprises at least 50 ppm alkali-metal cations.

In a tenth embodiment, the present disclosure provides the copolymer of any one of the first to ninth embodiments, wherein the copolymer has a polydispersity of less than or equal to 2.5.

In an eleventh embodiment, the present disclosure provides the copolymer of any one of the first to tenth embodiments, wherein the units independently represented by formula

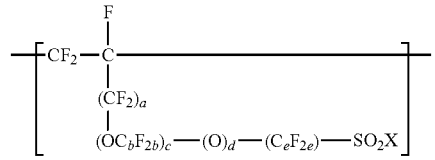

are present in an amount up to 0.5 mole percent or less than 0.5 mole percent, based on the total amount of the copolymer.

In a twelfth embodiment, the present disclosure provides the copolymer of any one of the first to eleventh embodiments, wherein the copolymer further comprises units independently represented by formula

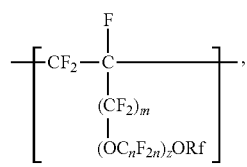

wherein each n is independently from 1 to 6, m is 0 or 1, z is 0, 1, or 2, and Rf is a linear or branched perfluoroalkyl group having from 1 to 8 carbon atoms and optionally interrupted by one or more —O— groups.

In a thirteenth embodiment, the present disclosure provides the copolymer of the twelfth embodiment, wherein m is 0.

In a fourteenth embodiment, the present disclosure provides the copolymer of the twelfth or thirteenth embodiment, wherein z is 1 or 2.

In a fifteenth embodiment, the present disclosure provides the copolymer of any one of the twelfth to fourteenth embodiments, wherein Rf is —$CF_3$, and wherein n is 1 or 3.

In a sixteenth embodiment, the present disclosure provides the copolymer of the twelfth or thirteenth embodiment, wherein m is 0, and z is 0.

In a seventeenth embodiment, the present disclosure provides the copolymer of any one of the twelfth to sixteenth embodiments, wherein the copolymerized units independently represented by formula:

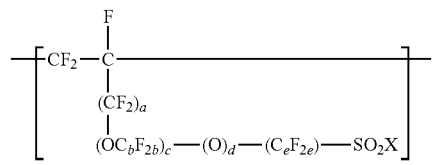

and the copolymerized units independently represented by formula:

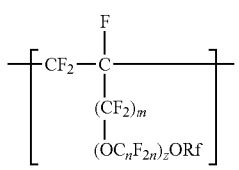

are present in the copolymer in a combined amount from 0.02 mole percent to 2 mole percent, based on the total amount of the copolymer.

In an eighteenth embodiment, the present disclosure provides the copolymer of any one of the first to seventeenth embodiments, wherein the hexafluoropropylene units are present in the copolymer at 10 percent to 17 percent by weight, based on the total weight of the copolymer.

In a nineteenth embodiment, the present disclosure provides the copolymer of any one of the first to the eighteenth embodiments having a melting point in a range from 220° C. to 285° C.

In a twentieth embodiment, the present disclosure provides the copolymer of any one of the first to nineteenth embodiments, wherein the copolymer is not foamed.

In a twenty-first embodiment, the present disclosure provides the copolymer of any one of the first to nineteenth embodiments, wherein the copolymer is foamed.

In a twenty-second embodiment, the present disclosure provides the copolymer of any one of the first to twenty-first embodiments, wherein the copolymer has a melt flow index (measured at 372° C./5 kg) in a range from 25 grams per 10 minutes to 35 grams per 10 minutes.

In a twenty-third embodiment, the present disclosure provides the copolymer of any one of the first to twenty-second embodiments, wherein the copolymer has a melt flow index (measured at 372° C./5 kg) in a range from 27 grams per 10 minutes to 33 grams per 10 minutes.

In a twenty-fourth embodiment, the present disclosure provides the copolymer of any one of the first to twenty-third embodiments, further comprising —$SO_2X$ end groups.

In a twenty-fifth embodiment, the present disclosure provides a method of making an extruded article, the method comprising extruding a melted composition comprising (or consisting of) the copolymer of any one of the first to twenty-fourth embodiments.

In a twenty-sixth embodiment, the present disclosure provides the method of the twenty-fifth embodiment, wherein the extruded article comprises at least one of a film, tube, pipe, or hose.

In a twenty-seventh embodiment, the present disclosure provides the method of the twenty-fifth or twenty-sixth embodiment, wherein the melted composition is extruded onto a conductor.

In a twenty-eighth embodiment, the present disclosure provides the method of any one of the twenty-fifth to twenty-seventh embodiments, wherein the melted composition is extruded onto a cable or wire.

In a twenty-ninth embodiment, the present disclosure provides an extruded article comprising the copolymer of any one of the first to twenty-fourth embodiments.

In a thirtieth embodiment, the present disclosure provides the extruded article of the twenty-ninth embodiment, wherein the extruded article comprises at least one of a film, tube, pipe, or hose. In a thirty-first embodiment, the present disclosure provides the extruded article of the twenty-ninth or thirtieth embodiment, wherein the extruded article is a conductor having the copolymer extruded thereon.

In a thirty-second embodiment, the present disclosure provides the extruded article of any one of the twenty-ninth to thirty-first embodiments, wherein the extruded article is a cable or wire having the copolymer extruded thereon.

In a thirty-third embodiment, the present disclosure provides the method of any one of the twenty-fifth to twenty-eighth embodiments or the extruded article of any one of the twenty-ninth to thirty-second embodiments, wherein the extruded article is not foamed.

In a thirty-fourth embodiment, the present disclosure provides the method of any one of the twenty-fifth to twenty-eighth embodiments or the extruded article of any one of the twenty-ninth to thirty-second embodiments, wherein the extruded article is foamed.

In a thirty-fifth embodiment, the present disclosure provides a method of making the copolymer of any one of the first to twenty-fourth embodiments, the method comprising copolymerizing components comprising tetrafluoroethylene, hexafluoropropylene, and at least one compound independently represented by formula $CF_2$=$CF(CF_2)_a$—$(OC_bF_{2b})_c$—$(O)_d$—$(C_eF_{2e})$—$SO_2X$, wherein a is 0 or 1, each b is independently from 1 to 4, c is 0 to 4, d is 0 or 1, e is 1 to 6, and X is independently —F, —$NH_2$, —OH, or —OZ, and wherein Z is independently a metallic cation or a quaternary ammonium cation.

In a thirty-sixth embodiment, the present disclosure provides the method of the thirty-fifth embodiment, wherein copolymerizing is carried out by aqueous emulsion polymerization.

In a thirty-seventh embodiment, the present disclosure provides the method of the thirty-fifth embodiment, wherein copolymerizing is carried out by suspension polymerization.

In a thirty-eighth embodiment, the present disclosure provides the method of any one of the thirty-fifth to thirty-seventh embodiments, wherein the components further comprise at least one compound independently represented by formula $CF_2$=$CF(CF_2)_m(OC_nF_{2n})_z$ORf, wherein each n is independently from 1 to 6, m is 0 or 1, z is 0, 1, or 2, and Rf is a linear or branched perfluoroalkyl group having from 1 to 8 carbon atoms and optionally interrupted by one or more —O— groups.

In a thirty-ninth embodiment, the present disclosure provides the method of the thirty-eighth embodiment, wherein m is 0.

In a fortieth embodiment, the present disclosure provides the copolymer of the thirty-eighth or thirty-ninth embodiment, wherein z is 1 or 2.

In a forty-first embodiment, the present disclosure provides the copolymer of any one of the thirty-eighth to fortieth embodiments, wherein Rf is —$CF_3$, and wherein n is 1 or 3.

In a forty-second embodiment, the present disclosure provides the copolymer of the thirty-ninth embodiment, wherein m is 0, and z is 0.

In a forty-third embodiment, the present disclosure provides the method of any one of the thirty-fifth to forty-second embodiments, wherein copolymerizing is carried out in the presence of a bisulfite or sulfite salt to generate —$SO_2X$ end groups, wherein X is independently —F, —$NH_2$, —OH, or —OZ, and wherein Z is independently a metallic cation or a quaternary ammonium cation.

In order that this disclosure can be more fully understood, the following examples are set forth. It should be understood that these examples are for illustrative purposes only and are not to be construed as limiting this disclosure in any manner. Abbreviations include g for grams, kg for kilograms, m for mass, mm for millimeters, L for liters, min for minutes, hrs for hours, rpm for revolutions per minute.

EXAMPLES

Test Methods:
MFI

The melt flow index (MFI), reported in g/10 min, was measured with a Goettfert MPX 62.92 melt indexer (Buchen, Germany) following a similar procedure to that described in DIN EN ISO 1133-1:2012-03 at a support weight of 5.0 kg and a temperature of 372° C. The MFI was obtained with a standardized extrusion die of 2.1 mm in diameter and a length of 8.0 mm.

Melting Point

The melting point of the fluorothermoplastic polymer was determined using differential scanning calorimetry following a similar procedure to that described in ASTM D4591-07 (2012) using a PerkinElmer Pyris 1 DSC (Waltham, Mass., USA) under nitrogen flow with a heating rate of 10° C./min. The reported melting points relate to the melting peak maximum.

Particle Size

The latex particle size determination was conducted by means of dynamic light scattering with a Malvern Zetasizer 1000HSA (Malvern, Worcestershire, UK) following a similar procedure to that described in DIN ISO 13321:2004-10. The reported average particle size is the z-average. Prior to the measurements, the polymer latexes as yielded from the polymerizations were diluted with 0.001 mol/L KCl-solution. The measurement temperature was 20° C. in all cases.

Monomer Unit Content

The content of $CF_2=CF-CF_2-O-(CF_2)_3-OCF_3$ (MA-31), $CF_2=CF-CF_2-O-C_3F_7$ (MA-3), $CF_2=CF-O-(CF_2)_3-OCF_3$ (MV-31), $CF_2=CF-O-C_3F_7$ (PPVE-1), $CF_2=CF-O-CF_2-CF(CF_3)-O-CF_2-CF_2-SO_2F$ (PSEPVE), and $CF_2=CF-CF_3$ (HFP) in the copolymer was determined by Fourier-transform infrared spectroscopy. Thin films of approximately 0.1 mm thickness were prepared by molding the polymer at 350° C. using a heated plate press. The films were than scanned in nitrogen atmosphere using a Nicolet DX 510 FT-IR spectrometer. The OMNIC software (ThermoFisher Scientific, Waltham, Mass., USA) was used for data analysis. The content of MA-31, MA-3, MV-31, PPVE-1, PSEPVE and HFP, reported in units of m/m %, was determined from an IR band at a monomer-specific wavenumber $v_M$ and was calculated as a product of a monomer-specific factor $\varepsilon_{rel}$ and the ratio of the absorbance of the IR-peak at $v_M$, $A(v_M)$, to the absorbance of the IR-peak at 2365 cm$^{-1}$, $A(2365$ cm$^{-1})$, meaning $\varepsilon_{rel} \times A(v_M)/A(2365$ cm$^{-1})$. Wavenumbers $v_M$ and factors $\varepsilon_{rel}$ are given in the following table:

| monomer | wavenumber $v_M$ [1/cm] | factor $\varepsilon_{rel}$ |
|---|---|---|
| $CF_2=CF-CF_2-O-(CF_2)_3-OCF_3$ | 892 | 3.81 |
| $CF_2=CF-CF_2-O-C_3F_7$ | 995 | 61 |
| $CF_2=CF-O-(CF_2)_3-OCF_3$ | 893 | 3.24 |
| $CF_2=CF-O-C_3F_7$ | 993 | 0.95 |
| $CF_2=CF-O-CF_2-CF(CF_3)-O-CF_2-CF_2-SO_2F$ | 1467 | 1.06 |
| $CF_2=CF-CF_3$ | 983 | 3.2 |

In case of the simultaneous presence of PPVE-1 and HFP, the deconvolution software "Peak Fit" from AISN Software Inc., version 4.06, was used to determine the monomer-specific absorbance of the IR-peak at $v_M$. The automatic peak detection and fitting method II, second derivative method, was applied.

End Group Analysis

Polymer end group detection was conducted in analogy to the method described in U.S. Pat. No. 4,743,658 (Imbalzano et al.). Thin films of approximately 0.50 mm were scanned on the same Nicolet Model 510 Fourier-transform infrared spectrometer. 16 scans were collected before the transform is performed, all other operational settings used were those provided as default settings in the Nicolet control software. Similarly, a film of a reference material known to have none of the end groups to be analyzed was molded and scanned. The reference absorbance spectrum is subtracted from the sample absorbance, using the interactive subtraction mode of the software. The $CF_2$ overtone band at 2365 wavenumbers is used to compensate for thickness differences between sample and reference during the interactive subtraction. The difference spectrum represents the absorbances due to non-perfluorinated polymer end groups. The number of end groups per million carbon atoms was determined via the equation: ends/1e6 carbons=absorbance×CF/film thickness in mm. The calibration factors (CF) used to calculate the numbers of end groups per million carbon atoms are summarized in the following table:

| End group | Wavenumber [1/cm] | Calibration Factor (CF) |
|---|---|---|
| —COF | 1885 | 1020 |
| —CONH$_2$ | 3438 | 1105 |
| —COOH, isolated | 1814 | 740 |
| —COOH, associated | 1775 | 112 |
| —CF$_2$H | 2950-3050 (integrated) | 846 |
| —CF(CF$_3$)H | 2820-3000 (integrated) | 224 |
| —CF=CF$_2$ | 1784 | 532 |
| —SO$_2$F | 1467 | 400 |
| —SO$_3$H | 1063 | 3030 |

After the interactive subtraction, the absorbance of the —SO$_3$H peak was not quantified using the OMNIC software of the Nicolet Model 510 Fourier-transform infrared spectrometer, because the weak —SO$_3$H peak is partially overlapping by other peaks in the direct neighborhood of 1063 l/cm and it appears as part of a peak-shoulder around 1050 l/cm. In this case, the deconvolution software "Peak Fit" from AISN Software Inc., version 4.06, was used to determine the absorbance the —SO$_3$H peak. The automatic peak detection and fitting method II, second derivative method, was applied with usually about 22% smoothing to a wave-number region of 1020 to 1075 l/cm. Four Pearson VII Amplitude peaks of uniform width and a linear 2 point baseline were usually applied to fit that region. The —SO$_3$H peak is the one located at the highest wavenumber, the corresponding absorbance is the parameter a0 taken from peak fit summary.

The —CF$_2$H peak is discernible at a peak around 3009 l/cm with a shoulder at about 2983 l/cm. The peak deconvolution procedure "Peak Fit" software from AISN Software Inc applied as described above in a region in between 2900 and 3100 l/cm reveals additional peaks located at about 2936, 2960, 3032 and 3059 l/cm. These peaks are integrated and the number of end groups per million carbon atoms was determined from the total peak area via the equation: ends/

1e6 carbons=area×CF/film thickness in mm, wherein a Calibration Factor of 846 was applied.

The —CF(CF$_3$)H group shows a broad peak band with main peaks around 2973, 2930 and 2858 l/cm. The peak deconvolution procedure "Peak Fit" software from AISN Software Inc applied in a region in between 2820 and 3000 l/cm may reveal additional peaks located at about 2830, 2845, 2871, 2885, 2900, 2916, 2943 and 2258 l/cm. These peaks are integrated and the number of end groups per million carbon atoms was determined from the total peak area via the equation: ends/1e6 carbons=area×CF/film thickness in mm, wherein a Calibration Factor of 224 was applied. When —CF$_2$H groups and —CF(CF$_3$)H groups are present at one time, the peak deconvolution procedure needs to be applied to the wavenumber region in between 2820 and 3050 l/cm. Then, the contributions of both groups to the broad peak need to be separated from each other and considered independently using the equations given above.

Polydispersity Determination by Melt Rheology

Oscillatory shear flow measurements were conducted on fluoropolymer melts using a strain controlled ARES rheometer (3ARES-13; Firmware version 4.04.00) (TA Instruments Inc., New Castle, Del., USA) equipped with a FRT 200 transducer with a force range of up to 200 g. Dynamic mechanical data were recorded in nitrogen atmosphere in frequency sweep experiments using a 25 mm parallel plate geometry and a plate to plate distance of usually 1.8 mm was realized. Individual frequency sweeps were recorded at a temperature of 372° C., 340° C., 300° C., 280° C. and in super-cooled melt at 260° C. The thermal control of the oven was operated using the sample/tool thermal element. A strain typically ascending from 1 to 20% was applied while the shear rate was descended from 100 rad/s to typically 0.1 rad/s. Using the time-temperature-superposition (TTS) tool provided by the orchestrator software (version 7.0.8.13), these individual frequency sweeps were combined to one master curve, wherein T=372° C. was selected as the reference temperature. Zero shear viscosities $\eta_0$, reported in units of Pa×s, were extrapolated from the viscosity function $\eta^*(\omega)$ of the obtained dynamic mechanical master curve using the 4 parameter Carreau fit function provided by the orchestrator software. The molecular weight distribution of fluoropolymer melts were extracted from the so-obtained dynamic mechanical data by the procedure disclosed by W. H. Tuminello in Polym. Engineering Sci., 26, 1339-1347 (1986) and in Encyclopedia of Fluid Mechanics, Vol. 9, Polymer Flow Engineering, 209. The method includes that the frequency is converted into a molecular weight. In the present case, the equation $$1/\omega=7.63e-22\times M^{3.6}$$

was used. In the same way as described by Tuminello, the cumulative molecular weight distribution (CMWD) is evaluated by forming the expression $$CMWD=100\times\{1-[G'(\omega)/G_N^0]^{0.5}\}.$$

Herein, a plateau modulus of $G_N^0=1.1e6$ Pa was used. In modification of the method described by Tuminello, the sigmoidal CMWD is approximated by a function of the Weibull-type:

$$CMWD=100*(1-\exp(-((x+d*(b-x0))/b)^c)), \text{ with}$$
$$x=\log M,$$

$$d=((c-1)/c)^{\wedge}(1/c); c=3.376+2.305*b; b=1.8+9.154e-4*600.95^{\wedge}chi$$

A user defined fit routine operating under the software SigmaPlot 12.5 (Systat Software, Inc.; San Jose/CA, USA) was used to determine the two fit parameters x0 and chi. The first derivative of the fit function was evaluated by applying the macro "Compute 1$^{st}$ Derivative" provided by the SigmaPlot 12.5 software. The first derivative of the fit function is representing a Schulz-Zimm distribution described by Equation (6) in Auhl et al., Macromolecules 2006, Vol. 39, No. 6, p. 2316-2324. The maximum of this distribution is given by the number average molecular weight $M_N$ and its breadth is controlled by the degree of coupling k. The degree of coupling k is then converted into the polydispersity index $M_W/M_N$ according to a 5-order polynomial:

$$k=d0+d1\times U+d2\times U^{\wedge}2+d3\times U^{\wedge}3+d4\times U^{\wedge}4+d5\times U^{\wedge}5;$$
$$\text{with } U=M_W/M_N$$

$$d0=183.3296154186 \; d1=-445.7760158725$$

$$d2=443.8169326941 \; d3=-223.4535380971$$

$$d4=56.6264675389 \; d5=-5.7637913869$$

Finally, the consistency of the obtained result is probed by comparing the mass average molecular weight $M_W$ of this Schulz-Zimm distribution with the one obtained from the zero shear viscosity by:

$$\eta_0(372° \text{ C.})=9.36e-17\times M_W^{3.6}.$$

The molecular weight distribution is correctly extracted from the rheology data in the case that both Mw values deviate from each other by less than ±5%. The results reported herein fulfill this consistency criterion.

Alkali-Ion Content

For the determination of the alkali-ion content, 1 g polymer was combusted in a muffle-type furnace (Linn High Term; Eschenfelden, Germany; VMK39 μP) for 10 hrs (air at 550° C.). The incineration residue was dissolved into 50 mL of a 4 vol. % aqueous solution of HCl/HF (5:1) (HCl: 30% aqueous solution available from Merck, Darmstadt/Germany, under the trade designation "SUPRAPUR"; HF: 40% aqueous solution available from Merck, Darmstadt/Germany under the trade designation "SUPRAPUR"). The acidic solution was further analyzed by an "AANALYST 200" Perkin Elmer flame atomic absorption spectrometer (Waltham, Mass./USA). The instrument was calibrated with 0.500 ppm and 1.000 ppm potassium aqueous standard solutions (Merck; Darmstadt/Germany; "CERTIPUR" Element Standard Solution). The peak height at a wavelength of 766.5 nm was used to evaluate the potassium content. The peak height at a wavelength of 589 nm was used to evaluate the sodium content.

Peel Strength

The peel strength of copper-polymer interfaces was determined using a Zwick materials testing machine Z010 with the software TestExpert 2 (Ulm, Germany). A 0.05 mm thick copper foil (O.F.H.C, 99.95%, half hard; Sigma-Aldrich, St. Louis, Mo., USA) was cleaned by storing it for 30 min at ambient temperature in an 1.5 wt. % aqueous solution of sulfamic acid (98%, Sigma-Aldrich), subsequent rinsing with purified water, and drying with a paper towel. Copper foil and polymer were pressed in between two 50 μm thick Kapton® 200 HN foils (Krempel, Vaihingen an der Enz, Germany) for 5 min at 360° C. and 53 bar to generate a 0.8 mm thick copper-polymer plate. Part of the copper foil was separated from the polymer during heat-pressing by a Kapton® foil to avoid bonding in this part. After conditioning for 20 hours at ambient pressure and 23° C. as well as removal of the Kapton® foils, 15 mm wide test specimens were punched out by means of a DIN 53455-08.1981 type punching knife (for test specimen no. 5; NAEF, Adliswil, Switzerland). The unbonded copper end was bent by 180° and then both unbonded ends were clamped in the test grips of the materials testing machine. The load was applied at 23° C. at a constant head speed of 150 mm/min and the load versus head movement was recorded while separating both materials at an angle of approximately 180°. The average peeling load for the first 30 mm of peeling after the initial peak was determined in Newton. The peel strength data reported herein refer to an average of at least four individual test runs.

Example 1

A Polymer of Tetrafluoroethylene (TFE), Hexafluoropropylene (HFP) and $CF_2=CF-O-CF_2CF(CF_3)-O-CF_2CF_2SO_2F$ (PSEPVE) was Prepared:

A 52-L-polymerization kettle with an impeller agitator was charged with 29 L deionized water, 50 g aqueous 30 wt. % ammonia-solution and 465 g of a 30 wt. % aqueous solution of ammonium 4,8-dioxa-3-H-perfluorononanoate ($CF_3-O-(CF_2)_3-O-CFH-CF_2-COONH_4$, prepared as described in "Preparation of Compound 11" in U.S. Pat. No. 7,671,112). The oxygen-free kettle was than heated to 70° C., and the agitation system was set to 275 rpm. PSEPVE (95 g, obtained from Anles (St. Petersburg, Russia)) was added, and TFE/HFP at a ratio of 42.4/57.6 mol % were added until a final pressure of 17.0 bar (1700 kPa) was reached. The polymerization was initiated by adding 65 g ammonium peroxydisulfate (APS), dissolved in 250 mL $H_2O$. The polymerization temperature was maintained at 70° C., and the pressure was kept at 17 bar (1700 kPa). The monomers feed was constant; overall 10.9 kg TFE, 1.3 kg HFP and 41 g PSEPVE were fed. The total runtime was 4 hours and 13 minutes. The obtained latex had a solid content of 31 wt %, and the average particle size was 82 nm. The solids were isolated by freeze-coagulation, washed with deionized water and dried for 16 hours at 120° C. to provide the polymer. The MFI (372° C./5 kg) was 27 g/10 min; the melting point was 241° C. The PSEPVE-content was determined as 0.8 wt %; the HFP-content was determined as 14.4 wt. %. The polydispersity was Mw/Mn is 1.8 and the ion contents were Na<5 ppm and K<5 ppm.

The end groups per $10^6$ carbon atoms were determined: COOH, assoc.=188; COOH, iso.=406; $CONH_2=7$; $SO_2F=847$, and the peel strength of this polymer was 4.58 N.

Example 2

Post-Fluorination of the Dried Polymer of Example 1:

A 10-L post-fluorination reactor was charged with 100 g of the dried polymer of Example 1. The oxygen-free reactor was then heated up to 200° C. Then the reactor was evacuated to 0.250 bar absolute (25 kPa). The vacuum was broken up to a pressure of 0.99 bar absolute (99 kPa) with a fluorine gas/nitrogen gas mixture (10 vol. %/90 vol. %, N50, Air Liquide; München/Germany). After 30 minutes reaction time, the fluorine/nitrogen mixture was evacuated to a pressure of 0.250 bar absolute (25 kPa). This process was repeated 14 times. Afterwards the reactor was vented and flushed with $N_2$ in thirty cycles.

The end groups per $10^6$ carbon atoms were determined: COOH, assoc.=1; COOH, iso.=0; $SO_2F=625$, and the peel strength of this polymer was 1.46 N.

Comparative Example 1

3M™ Dyneon™ FEP6322Z, commercially available from 3M Company, St. Paul, Minn., USA, with an MFI (372° C./5 kg) of 25 g/10 min was post-fluorinated for 14 cycles/30 min each at 200° C.; the end groups per $10^6$ carbon atoms were determined: COOH, assoc.=2; COOH, iso.=0; COF=1, and the peel strength of this polymer was 0.57 N.

Various modifications and alterations of this disclosure may be made by those skilled in the art without departing from the scope and spirit of the disclosure, and it should be understood that this invention is not to be unduly limited to the illustrative embodiments set forth herein.

What is claimed is:

1. A copolymer comprising tetrafluoroethylene units, hexafluoropropylene units, and units independently represented by formula

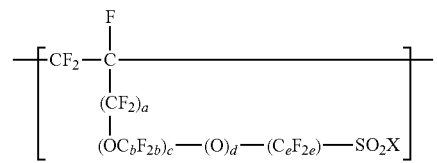

in a range from 0.001 to 2 mole percent, based on the total amount of the copolymer, wherein a is 0 or 1, each b is independently from 1 to 4, c is 0 to 4, d is 0 or 1, e is 1 to 6, and X is independently F, $-NH_2$, $-OH$, or $-OZ$, wherein Z is independently a metallic cation or a quaternary ammonium cation, and wherein the copolymer has a melt flow index in a range from 20 grams per 10 minutes to 40 grams per 10 minutes measured at a temperature of 372° C. and at a support weight of 5.0 kg.

2. The copolymer of claim 1, wherein c is 0, d is 1, and e is 1 to 4.

3. The copolymer of claim 1, wherein a is 0, $OC_bF_{2b}$ is $OCF_2CF(CF_3)$, c is 1 or 2, d is 1, and e is 1 to 4.

4. The copolymer of claim 1, wherein a is 1, b is 1, c is 0 to 4, d is 1, and e is 1 to 4.

5. The copolymer of claim 1, wherein the copolymer has a polydispersity of less than or equal to 2.5.

6. The copolymer of claim 1, wherein the copolymer has up to 100 unstable end groups per $10^6$ carbon atoms, wherein the unstable end groups are selected from $-COOM$, $-CH_2OH$, $-COF$, and $-CONH_2$, and wherein M is independently an alkyl group, a hydrogen atom, a metallic cation, or a quaternary ammonium cation.

7. The copolymer of claim 1, wherein the units independently represented by formula

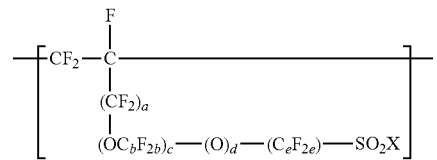

are present in a range from 0.001 to 0.5 mole percent, based on the total amount of the copolymer.

8. The copolymer of claim 1, wherein the hexafluoropropylene units are present in the copolymer at 10 percent to 17 percent by weight, based on the total weight of the copolymer.

9. The copolymer of claim 1, wherein the copolymer has a melting point in a range from 220° C. to 285° C.

10. The copolymer of claim 1, wherein the copolymer further comprises units independently represented by formula

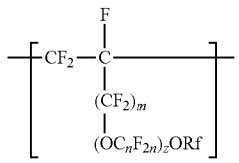

wherein each n is independently from 1 to 6, m is 0 or 1, z is 0, 1, or 2, and Rf is a linear or branched perfluoroalkyl group having from 1 to 8 carbon atoms and optionally interrupted by one or more —O— groups.

11. The copolymer of claim 10, wherein the copolymerized units independently represented by formula

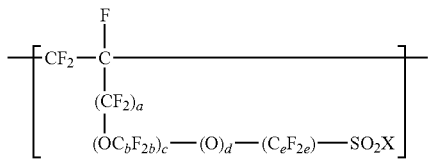

and the copolymerized units independently represented by formula

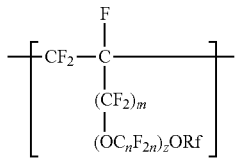

are present in the copolymer in a combined amount from 0.02 mole percent to 2 mole percent, based on the total amount of the copolymer.

12. A method of making an extruded article, the method comprising extruding a melted composition comprising the copolymer of claim 1.

13. An extruded article comprising the copolymer of claim 1.

14. A method of making the copolymer of claim 1, the method comprising copolymerizing components comprising tetrafluoroethylene, hexafluoropropylene, and at least one compound independently represented by formula $CF_2=CF(CF_2)_a-(OC_bF_{2b})_c-(O)_d-(C_eF_{2e})-SO_2X$, wherein a is 0 or 1, each b is independently from 1 to 4, c is 0 to 4, d is 0 or 1, e is 1 to 6, and X is independently F, —NH$_2$, —OH, or —OZ, and wherein Z is independently a metallic cation or a quaternary ammonium cation.

15. The method of claim 14, wherein copolymerizing is carried out in the presence of a bisulfite or sulfite salt to generate —SO$_2$X end groups, wherein X is independently —F, —NH$_2$, —OH, or —OZ, and wherein Z is independently a metallic cation or a quaternary ammonium cation.

16. The extruded article of claim 13, wherein the extruded article comprises at least one of a film, tube, pipe, or hose.

17. The extruded article of claim 13, wherein the extruded article is a conductor having the copolymer extruded thereon.

18. The extruded article of claim 13, wherein the extruded article is a cable or wire having the copolymer extruded thereon.

19. The copolymer of claim 10, wherein z is 1 or 2.

20. The copolymer claim 1, further comprising —SO$_2$X end groups.

* * * * *

UNITED STATES PATENT AND TRADEMARK OFFICE
CERTIFICATE OF CORRECTION

| | | |
|---|---|---|
| PATENT NO. | : 10,717,795 B2 | Page 1 of 1 |
| APPLICATION NO. | : 15/550314 | |
| DATED | : July 21, 2020 | |
| INVENTOR(S) | : Denis Duchesne et al. | |

It is certified that error appears in the above-identified patent and that said Letters Patent is hereby corrected as shown below:

In the Claims

<u>Column 24</u>
Line 28, in Claim 1, delete "F," and insert -- —F, --, therefor.

<u>Column 26</u>
Line 17, in Claim 14, delete "F," and insert -- —F, --, therefor.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*